(12) United States Patent
Ziegler et al.

(10) Patent No.: US 6,393,348 B1
(45) Date of Patent: May 21, 2002

(54) PASSENGER MONITORING VEHICLE SAFETY SEAT AND MONITORING DEVICE

(76) Inventors: Douglas K. Ziegler, 1350 W. Walnut St., Allentown, PA (US) 18102; Arkady Voloshin, 3086 Glendon Rd., Bethlehem, PA (US) 18017-2547

( * ) Notice: Subject to any disclaimer, the term of this patent is extended or adjusted under 35 U.S.C. 154(b) by 0 days.

(21) Appl. No.: 09/616,350

(22) Filed: Jul. 14, 2000

(51) Int. Cl.[7] .................... G06F 17/00; G06F 7/00
(52) U.S. Cl. .................. 701/45; 180/271; 280/735; 340/438
(58) Field of Search ................. 701/28, 45, 46; 180/271; 280/734, 735; 340/425.5, 438

(56) References Cited

U.S. PATENT DOCUMENTS

| | | | |
|---|---|---|---|
| 4,569,536 A | 2/1986 | Tsuge | 280/807 |
| 4,655,505 A * | 4/1987 | Kashiwamura et al. | 297/284 |
| 4,851,816 A | 7/1989 | Macias et al. | 340/573 |
| 5,119,072 A | 6/1992 | Hemingway | 340/573 |
| 5,241,300 A | 8/1993 | Buschmann | 340/573 |
| 5,285,321 A | 2/1994 | Nolan-Brown | 359/857 |
| 5,400,012 A | 3/1995 | Walton | 340/573 |
| 5,493,270 A * | 2/1996 | Kondo | 340/438 |
| 5,522,639 A * | 6/1996 | Jaime | 297/184.13 |
| 5,555,458 A * | 9/1996 | Large | 340/945 |
| 5,640,145 A | 6/1997 | Newham | 340/573 |
| 5,668,526 A | 9/1997 | Collins | 340/326 |
| 5,793,291 A | 8/1998 | Thornton | 340/573 |
| 5,836,240 A | 11/1998 | Johnson | 340/604 |
| 5,838,233 A | 11/1998 | Hawes et al. | 340/572 |
| 5,912,624 A | 6/1999 | Howard | 340/632 |
| 5,914,660 A | 6/1999 | Mesibov et al. | 340/573 |
| 5,996,421 A | 12/1999 | Husby | 73/862.451 |
| 6,016,103 A | 1/2000 | Leavitt | 340/575 |

* cited by examiner

Primary Examiner—Gertrude Arthur
(74) Attorney, Agent, or Firm—Harold I. Masteller, Jr.

(57) ABSTRACT

An improved passenger monitoring safety seat and system to monitor vital functions of a passenger placed in the vehicle safety seat. The system includes at least one sensor adapted of contact a passenger placed in the vehicle safety seat so that said sensor provides and transmits an electrical output signal indicative of a selected vital function pertaining to the passenger. A display unit, remote from the vehicle safety seat, includes a receiver and circuitry to acquire and amplify the output signal transmitted by the sensor, and the display unit provides a visual display indicative of said selected vital function. The display unit also provides an alarm if the output signal from the sensor falls outside a pre-selected range.

36 Claims, 9 Drawing Sheets

PASSENGER MONITORING VEHICLE SAFETY SEAT AND MONITORING DEVICE

BACKGROUND OF THE INVENTION

1. Field of the Invention

This invention is directed to a system for monitoring one or more vital functions of a passenger placed in a vehicle safety seat, the system providing a real time display of vital functions pertaining to the passenger, and in particular, the invention is directed to monitoring and providing a real time display of one or more vital functions pertaining to an infant placed in an infant bearing device, for example, but not limited to, a vehicle safety seat.

It is well documented, and in some instances legislated, that infant and/or child vehicle safety seats should not be placed on the front seat of a vehicle, and in particular, on the front seat of a vehicle equipped with a passenger side inflatable air bag system. Studies show that children are about 30% safer when placed on the back seat of a vehicle. However, there is still an effort within the industry to develop a vehicle safety seat that will allow parents to safely place their children on the front seat of a vehicle without any fear of injury if the passenger side air bag is inflated. One driving force behind the effort to develop a "safe for front seat" vehicle safety seat, is parental displeasure and concern over the need to place their child on the rear seat of the vehicle, out of sight, and out of reach of the parent. Such rear seated children, and especially rear seated infants, tend to make many parents uncomfortable with respect to the well being of their child, and in some instances, over concerned parents may even threaten the overall safety of the passengers riding in the vehicle as indicated in a CNN article entitled "Infant seat safe for a front seat?" published Mar. 3, 1999. The article points out that, in certain instances, where a child is riding in a safe seat position, where the safety seat is placed on the rear seat of a car, about 30% of the accidents under such safe seat conditions are caused by a driver's distraction away from the road due to concern for the child on the rear seat. In other words, the concerned driver tends to focus his/her attention on the child rather than on road conditions and on driving the car. Therefore, although placing an infant or child into a safety seat located in the rear safe seat position may be safer from the infant/child viewpoint, overall vehicle safety may be reduced by as much as 30% due to driver distraction. Such risk is unacceptable from a safety viewpoint.

2. Brief Description of the related Art

Various devices have been developed in the past to monitor infants and children placed within vehicles. Some of these past devices have made an attempt to overcome the above mentioned problems associated with placing children in the safe seat position on the rear seat a vehicle. For example, two exemplary safe seat devices that improve driver/child contact are disclosed in U.S. Pat. Nos. 5,668,526 and 5,285,321. Both patents recognize the problem of parental concern over reduced contact with the infant, and both patents overcome the problem by providing mirror arrangements that allow the parent to view the rear seated child while driving the car. Other vehicle-related monitors, not directed to the safe seat problems associated with vehicle safety seats, have been developed to monitor children. Such monitors include, for example, child-monitoring devices that sound an alarm to prevent parents from inadvertently locking the children in parked cars as taught in U.S. Pat. No. 5,793,291. Another such monitor was developed to prevent possible kidnapping of children as disclosed in U.S. Pat. No. 5,640,145. Still other vehicle related monitors have been developed to be responsive to either the presence or absence of an infant/child safety seat on the passenger side front seat. Such devices may include means to disable the passenger side air bag system in response to the detected presence of an infant/child safety seat. Exemplary patents showing such devices are disclosed in U.S. Pat. No. 5,996,421 and U.S. Pat. No. 5,838,233.

There are also many different infant/child-monitoring devices that have been developed that are not related to vehicle use. For example, there are monitoring systems that detect wet diapers, and audio monitor systems that simply watch over child activity from a remote location as shown in U.S. Pat. Nos. 5,838,240, and 5,119,072 respectively. There is a large number of monitoring devices that attempt to provide an early warning alert in an attempt to prevent Sudden Infant Death Syndrome (SIDS). Exemplary United States patents showing such SIDS early warning devices are U.S. Pat. No. 5,914,660, U.S. Pat. No. 5,912,624, U.S. Pat. No. 5,400.012, U.S. Pat. No. 5,241,300, and U.S. Pat. No. 4,851,816. These devices range from motion and audio detectors to temperature and breathing sensors, and one monitor system even includes a device that detects and responds to wet diapers with an alert concerning a possible SIDS event.

Finally, vehicle related monitor systems have also been developed for adult use, and in particular, systems have been developed to alert a drowsy driver to prevent him/her from falling asleep behind the wheel. Two such devices are disclosed in U.S. Pat. No. 6,016,103, and U.S. Pat. No. 4,569,536.

Although many different infant/child monitoring devices have been developed in the past, and although there are various monitors available for use in a vehicle, it appears the art is silent with respect to a monitor system that provides a driver with a real time display of information related to the well being of an infant/child riding in a vehicle safety seat placed in the safe seat position on the rear seat of a vehicle. Therefore, as indicated in the above mentioned Mar. 3, 1999 CNN article, there is a long felt need within the art to overcome driver apprehension associated with such a rear seated child while at the same time allowing the driver to remain focused on driving conditions.

SUMMARY OF THE INVENTION

It is an object of the present invention to provide a vehicle safety seat that includes a system for monitoring one or more vital functions of a passenger placed in the vehicle safety seat.

It is another object of the present invention to provide a passenger monitoring vehicle safety seat capable of providing a real time display of one or more vital functions pertaining to a passenger placed in the vehicle safety seat.

It is another object of the present invention to provide a passenger monitoring vehicle safety seat capable of monitoring and comparing passenger vital functions with pre-stored vital function data.

It is still another object of the present invention to provide passenger monitoring vehicle safety seat having an alarm responsive to a condition where passenger vital functions fall outside a limit set by a pre-stored vital function data.

Finally, it is an object of the present invention to provide an infant monitoring safety seat that reduces driver anxiety related to placing an infant in the safe seat position on the rear seat of a vehicle.

In satisfaction of the foregoing objects and advantages, the present invention provides an improved passenger monitoring safety seat and system to monitor vital functions of a passenger placed in the vehicle safety seat. The system includes at least one sensor adapted to contact a passenger placed in the vehicle safety seat so that said sensor provides and transmits an electrical output signal indicative of a selected vital function pertaining to the passenger. A display unit, remote from the vehicle safety seat, includes a receiver and circuitry to acquire and amplify the output signal transmitted by the sensor, and the display unit provides a visual display indicative of said selected vital function. The display unit also provides an alarm if the output signal from the sensor falls outside a pre-selected range.

DETAILED DESCRIPTION OF THE PREFERRED EMBODIMENT

Figure 1A:
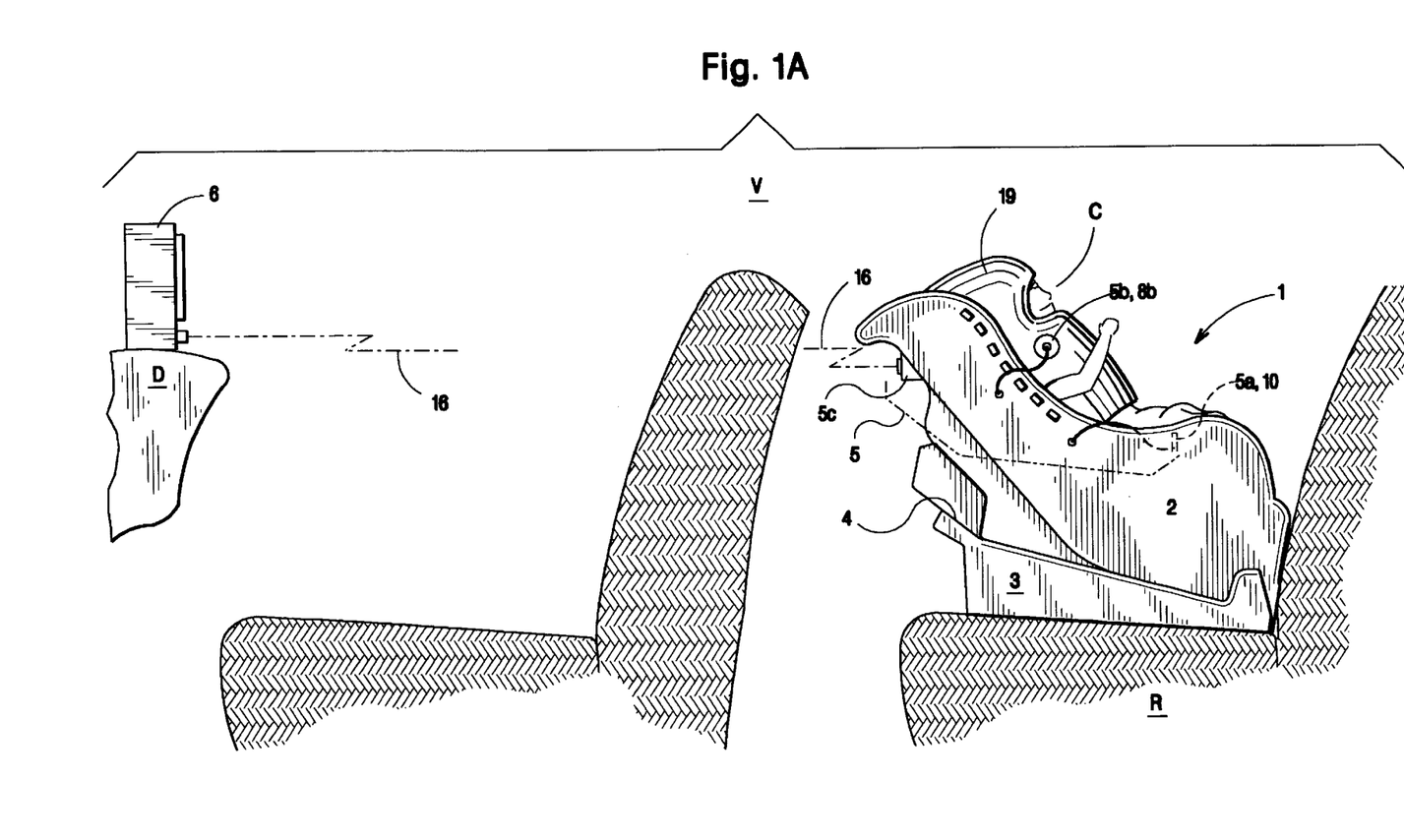
FIG. 1A is a view of the present infant monitoring vehicle safety seat invention positioned on the rear seat of a vehicle.
Figure 1B:
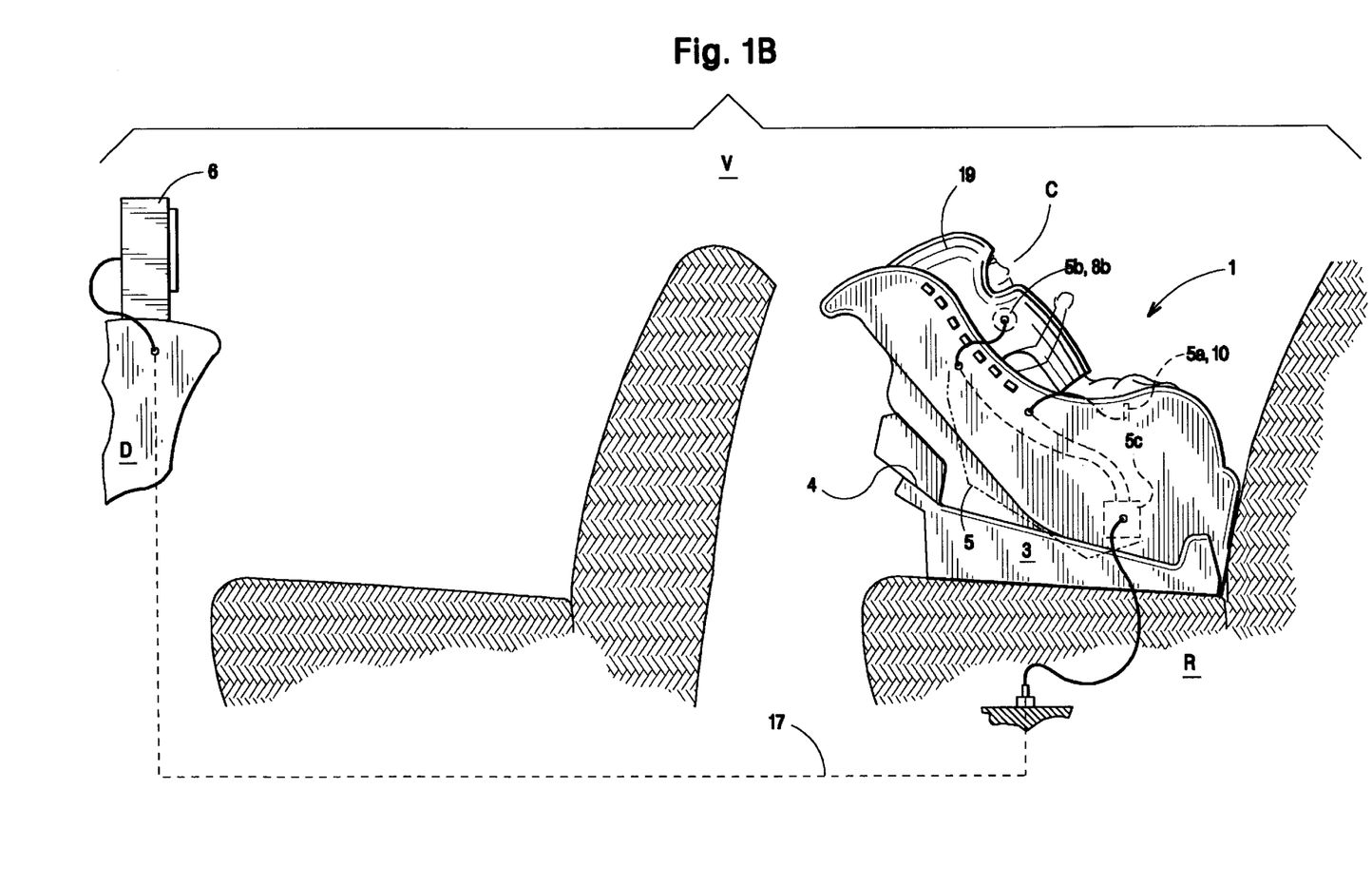
FIG. 1B is a view of another embodiment of the present infant monitoring vehicle safety seat invention positioned on the rear seat of a vehicle.
Figure 1C:
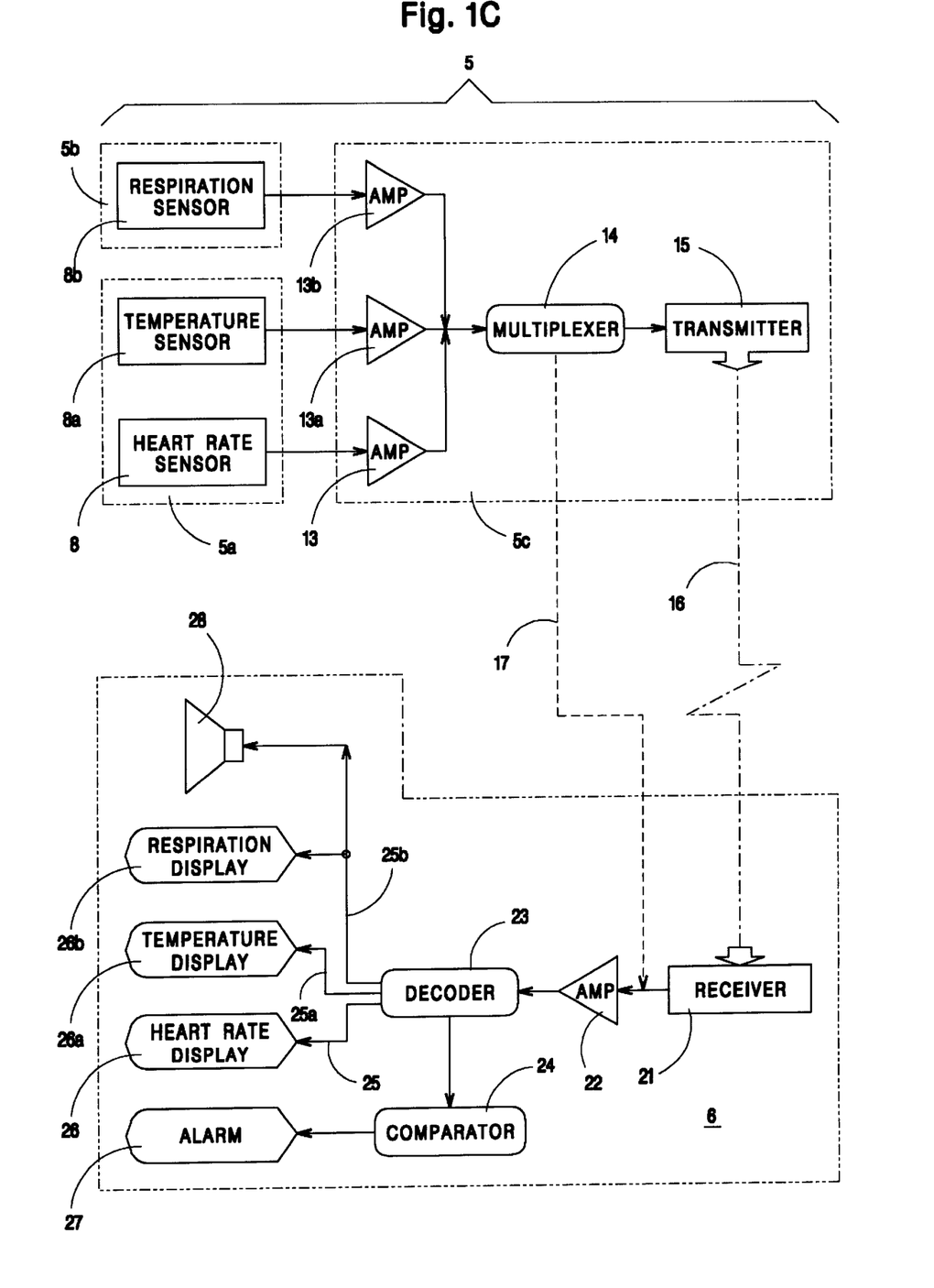
FIG. 1C is a schematic view showing sensor/transmitter and receiver/display portions of the present invention for monitoring an infant placed in the infant monitoring vehicle safety seat.

Referring to FIGS. 1A–1C, a passenger monitoring vehicle safety seat 1 of the present invention is shown in a preferred safe seat position on the rear seat "R" of a vehicle "V". The passenger, or infant monitoring safety seat includes an infant bearing device 2 and a base 3 that includes a cooperating locking arrangement 4 for attaching the infant bearing device portion 2 to base 3. Although not shown in any of the drawings, it should be understood that base 3 is fastened to the vehicle seat "R" using any state of the art fastening arrangement that meets vehicle safety codes. The preferred embodiment of the infant bearing device portion 2, the infant monitoring vehicle safety seat 1 is similar to the safety seat disclosed in applicant's earlier issued U.S. Pat. No. 5,765,893, the disclosure of which is hereby incorporated by reference.

Referring to the FIGS. 1A–1C the preferred infant monitoring system comprises a sensor/transmitter (S/T) unit 5, shown generally along the phantom line labeled 5, and a receiver/display (R/D) unit 6 mounted on the dashboard "D". The S/T unit includes a sensor portion 5a, an audio portion 5b, and a transmitter portion 5c that receives electrical signals generated by the sensor and audio portions 5a and 5b. In the preferred embodiment, the S/T portions 5a, 5b, and 5c are incorporated within the infant bearing device 2 portion of the vehicle safety seat 1 while the R/D unit 6 is separate from the infant bearing device 2 so that it may be placed at a remote location, for example, but not limited to, on the dashboard "D" of the vehicle, within close proximity to the driver. Alternatively, the S/T/ unit 5 may be adapted so that the portions 5a, 5b, and 5c are detachable from the infant bearing device 2 so that the S/T unit may be used to monitor an infant placed in a different infant bearing device, for example a stroller, carriage, crib, etc.

Figures 2A, 2B, 3:
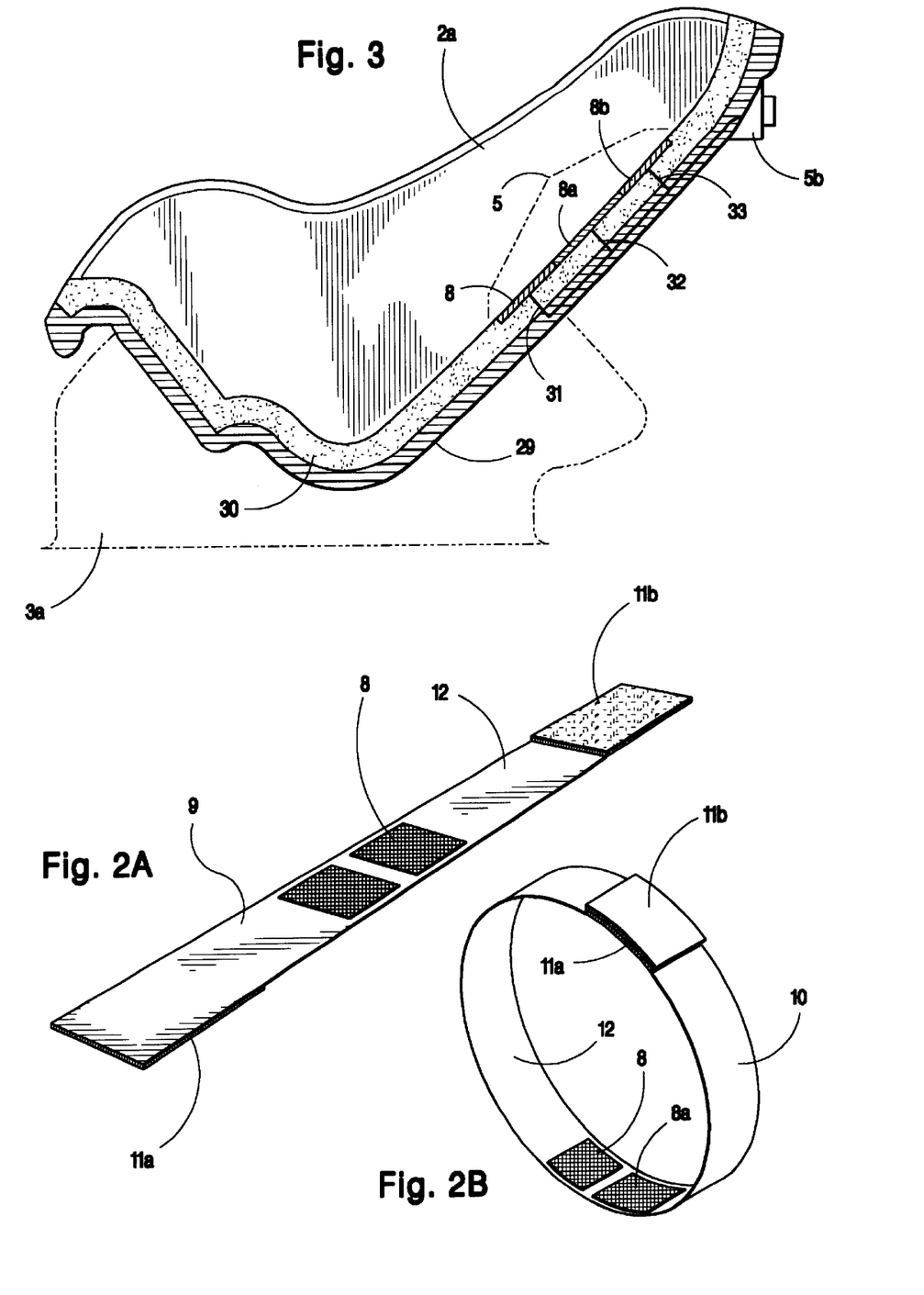
FIG. 2A is an isometric view of a sensor device.
FIG. 2B shows the sensor device of FIG. 2A formed into a bracelet.
FIG. 3 is a view showing an alternate embodiment of the present infant monitoring vehicle safety seat invention.
Figure 4A:
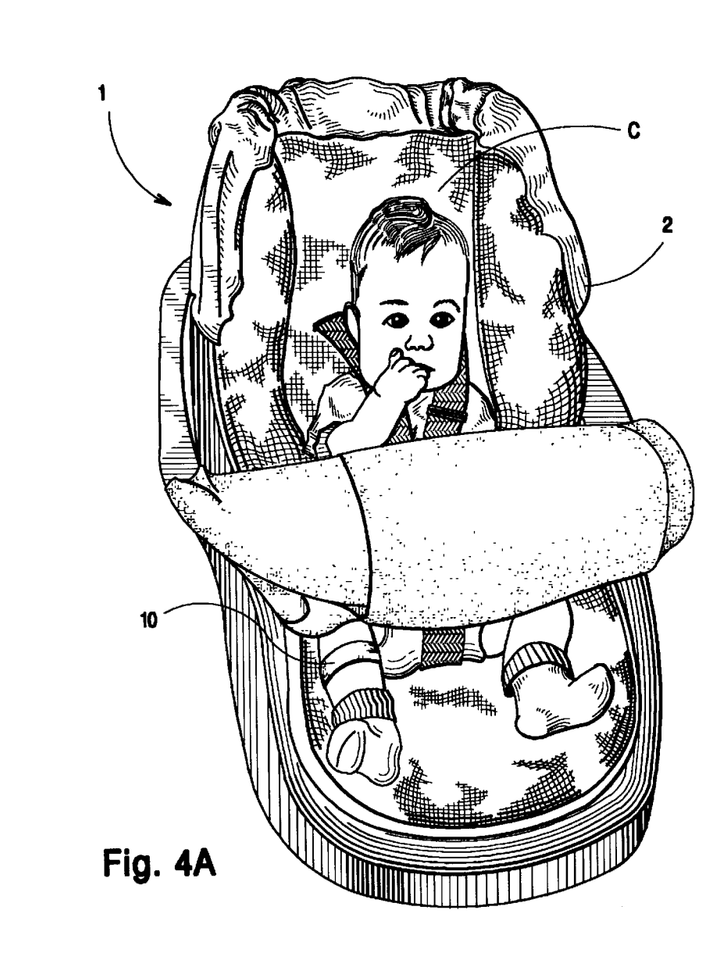
FIG. 4A is a view showing the present infant monitoring device being used in combination with a different vehicle safety seat.
Figure 4B:
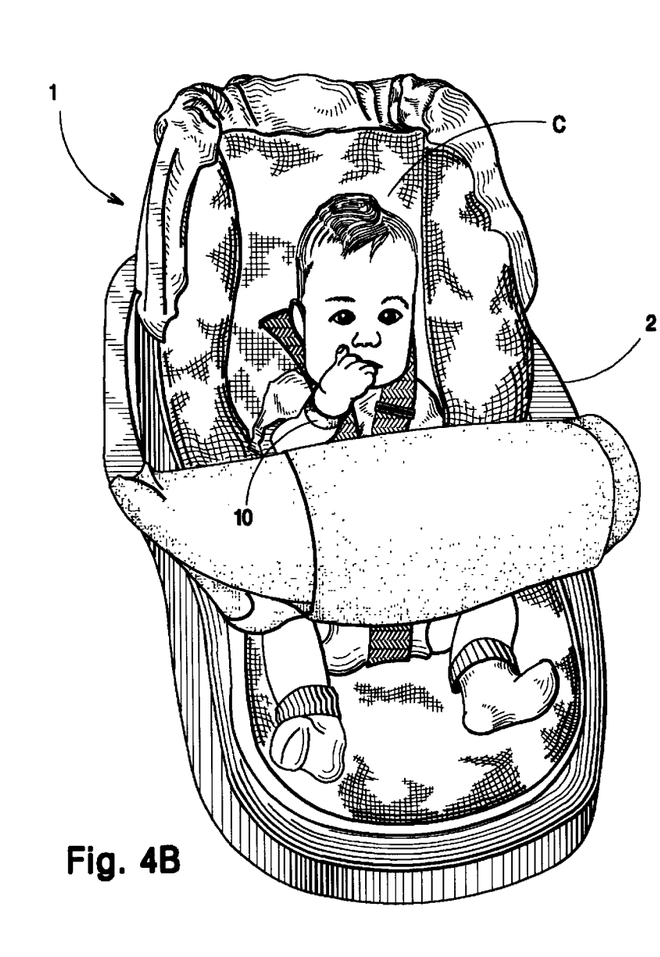
FIG. 4B is a view similar to FIG. 4A showing an alternate sensor position.

Sensor portion 5a includes at least one sensor suitable for detecting a selected particular vital function of an infant being monitored. In one possible embodiment shown in FIGS. 2A and 2B, the sensor device comprises a flexible strip 9 that may be formed into a bracelet 10 by attaching cooperating portions of a Velcro fastener 11a and 11b, or other suitable fastener means, provided at opposite ends of strip 9. At least one sensor 8 is attached to the flexible strip surface 12 so that when the flexible strip is formed into a bracelet, as shown in FIG. 2B, sensor 8 is located along the inside surface 12 of the sensor device. The preferred embodiment includes a sensor bracelet 10 with two sensors 8 and 8a for detecting heart rate and temperature respectively. Sensor device 10 is attached to either the arm or the leg of a child "C" being monitored as shown in FIGS. 4A and 4B, with the leg attachment being preferred because it is less likely to be disturbed by the child "C". The electronic sensing elements in sensors 8 and 8a are positioned to touch the skin of child "C" to more accurately detect temperature and heart rate. However, it should be understood that if sensors 8 and 8a are capable of generating an electrical signal indicative of a selected vital function without contacting the skin of the child being monitored, for example contacting an article of clothing, they may be so positioned without departing from the scope of this invention.

Referring again to FIG. 1C, sensor 8 transmits electrical signals to an amplifier 13, and sensor 8a transmits signals to an amplifier 13a the amplifiers 13 and 13a may be powered by, for example, a 3-volt DC power source. However, they may just as well be attached to the vehicle power source via a jack connection (not shown). The amplified signals are received by a multiplexer 14 where each signal is converted to digital form and the output is fed into a transmitter 15. The transmitter sends a radio signal 16 that contains information from both sensors 8 and 8a (FIG. 1A) or the S/T unit may be modified to send a line signal 17 that contains information from both sensors 8 and 8a (FIG. 1b). The power of the transmitted signal may be relatively low, for example, up to about 0.1 watts at a frequency range of about 800–970 MHz, and a preferred frequency of about 900 MHz.

As shown in FIGS. 1A–1C, the S/T unit may also include an optional audio sensor device 5b for monitoring respiratory signs. The audio sensor may comprises a built-in miniature microphone 8b similar to model ATM 35 sold by Audio-technica. The microphone 8b is positioned to pickup the breathing sounds of the infant "C" being monitored, and as shown in FIGS. 1A and 1B, microphone 8b may be incorporated into the crash-protecting papoose portion 19 of the infant bearing device 2 at a location suitable for monitoring infant breathing. As shown in FIG. 1C, the miniature microphone, or respiratory sensor 8b, transmits electrical signals to amplifier 13b and the amplified signals are sent to the multiplexer 14 where the signals are also converted to digital form, and the output signal containing information from all three sensors 8, 8a, and 8b is fed into a transmitter 15.

Still referring to FIG. 1C, the radio signal emitted from transmitter 15 is acquired by receiver 21 housed within the R/D unit 6, and the acquired signal is sent to amplifier 22 powered by, for example, a 12 volt power source. In the alternate embodiment shown in FIG. 1B, where a line signal 17 is sent to the R/D unit 6, the digitized signal containing information from sensors 8, 8a, and 8b, is fed along alternate line 17 extending between multiplexer 14 and amplifier 22. The amplified signals are received by a decoder 23 that separates the combined signal into individual channels indicative of the respective vital functions being monitored. In this instance, decoder 23 separates the signals into a heart rate channel 25, a temperature channel 25a, and an audio or respiratory channel 25b. Each signal is analyzed by decoder 23, the output is shown on a heart rate display 26, and a temperature display 26a provided in the R/D unit 6. The audio signal, corresponding to sensor 8b, is fed to speaker 28. The audio or respiratory signal may also be fed to a respiratory display 26b. The vital function displays 26, 26a, and 26b may comprise either a liquid crystal display (LCD), a digital LED display, or any other display suitable of providing the user with a wave pattern and/or a alphanumeric display indicative of the monitored vital functions.

Additionally, the decoded temperature, heart rate, and if desired, respiratory data is also sent to a comparator 24 that includes a resident program for comparing the incoming stream of data with pre-stored baseline information related to the vital functions being monitored. In instances where either the real time temperature, heart rate, or respiratory data falls outside certain limits set by the pre-stored information, a signal is sent from the comparator 24 to activate an audio/visual alarm 27. If desired, the pre-stored limits that trigger the alarm may be adjustable so a user will be able to select alarm settings.

Figure 4C:
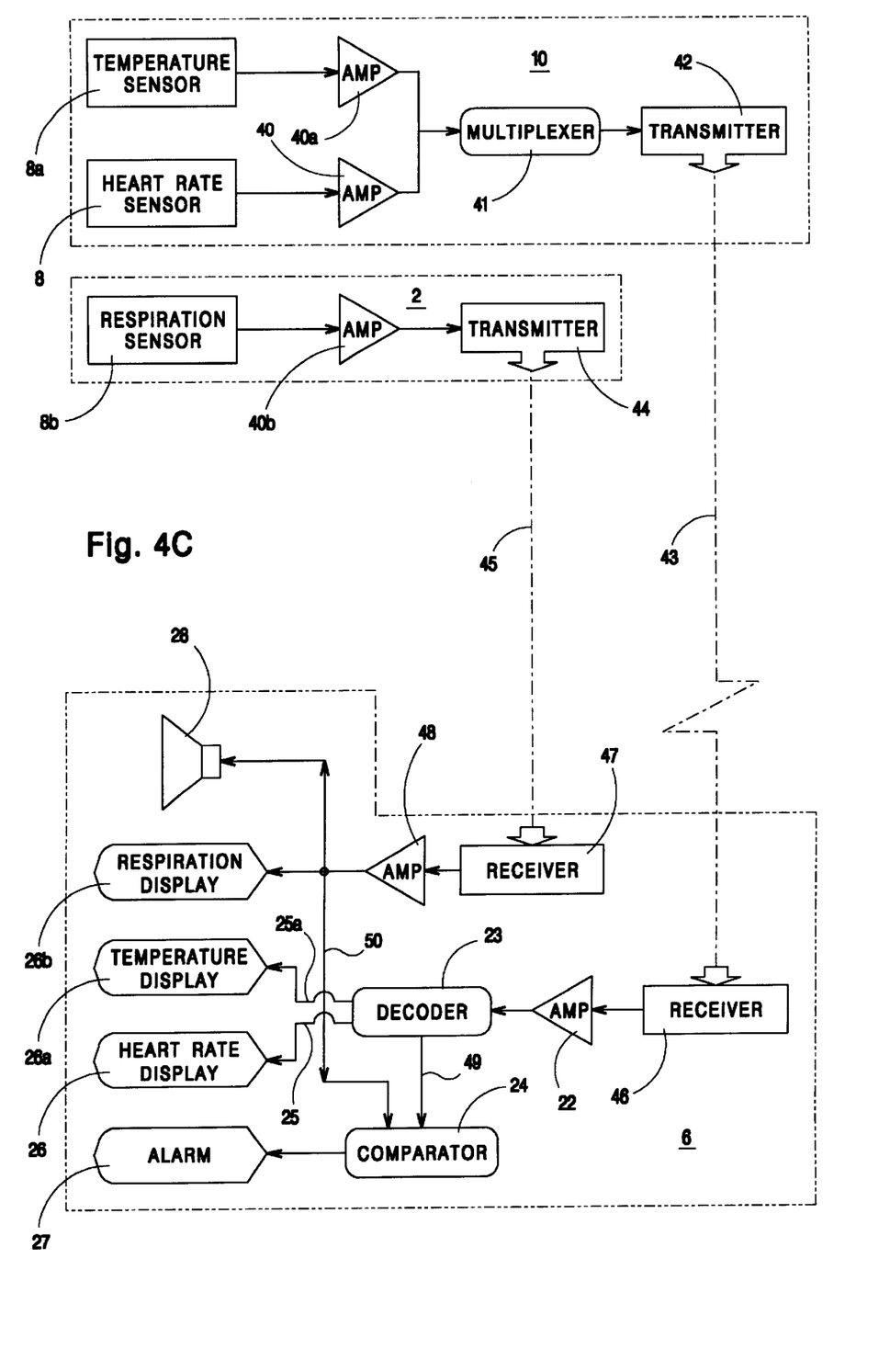
FIG. 4C is a schematic view showing alternate sensor/transmitter and receiver/display units for monitoring an infant placed in the infant monitoring vehicle safety seat of the present invention.

Referring to FIGS. 4A, 4B, and 4C, the infant monitoring device is not limited to use in any one particular vehicle safety seat, and it may be adapted to fit any vehicle safety seat that is either currently available on the market or that will become available in the future marketplace. Additionally, it should be understood that the monitoring device may be modified to incorporate both the sensor portion 5a and the transmitter portion 5b into a single bracelet device 10, as shown in FIG. 4C, and that such a bracelet may transmit either a radio signal or a line signal directly to the R/D unit 6.

Referring again to FIG. 4C, a sensor device comprising a bracelet 10 includes at least one sensor to detect and provide an electrical signal indicative of a selected vital function of the passenger being monitored. In the embodiment shown in FIG. 4C, the bracelet includes a heart rate sensor 8 and a temperature sensor 8a. The output signal from sensors 8 and 8a is sent to powered amplifiers 40 and 40a respectively and the increased signal is received by multiplexer 41 where the signals from amplifiers 40 and 40a are converted to digital form and the output from multiplexer 41 is fed into a transmitter 42 that transmits a radio signal 43 containing information from both sensors 8 and 8a. An audio or respiration sensor 8b is attached to the infant bearing device portion 2 of the passenger monitoring vehicle safety seat. The output signal generated by sensor 8b is sent to a powered amplifier 40b and the increased signal is received by transmitter 44 that transmits a radio signal 45 containing audio information from sensor 8b. The radio signals 43 and 45 are also low powered signals and the two radio signals are transmitted at different frequencies in order to maintain the information on separate signals.

The R/D unit 6 includes a receiver 46 for receiving the incoming radio signals 43 from transmitter 42, and a receiver 47 for receiving incoming radio signals 45 from transmitter 44. As heretofore described, the acquired signal is sent to amplifier 22 powered by, for example, a 12 volt power source. The amplified signals are received by a decoder 23 that separates the combined signal into individual channels indicative of the respective vital functions being monitored. In this instance, decoder 23 separates the signals into a heart rate channel 25 and a temperature channel 25a. Each signal is analyzed by decoder 23 and the output is shown on a heart rate display 26 and a temperature display 26a provided in the R/D unit 6. The output from receiver 47 containing the audio signal information corresponding to sensor 8b, is fed to a power amplifier 48. The amplified audio or respiratory signal is fed to a respiratory display 26b and/or a speaker 28.

Additionally, the decoded heart rate and temperature is sent to comparator 24 along line 49, and the audio or respiratory data is sent to a comparator 24 along line 50. The incoming stream of real time data received by comparator 24 is compared with pre-stored baseline information related to the vital functions being monitored. If any of the incoming real time data, for example heart rate, temperature, or respiratory data, falls outside certain limits set by the pre-stored information, a signal is sent from the comparator 24 to activate an audio/visual alarm 27. If desired, the pre-stored limits that trigger the alarm may be adjustable so a user will be able to select alarm settings.

Figure 5A:
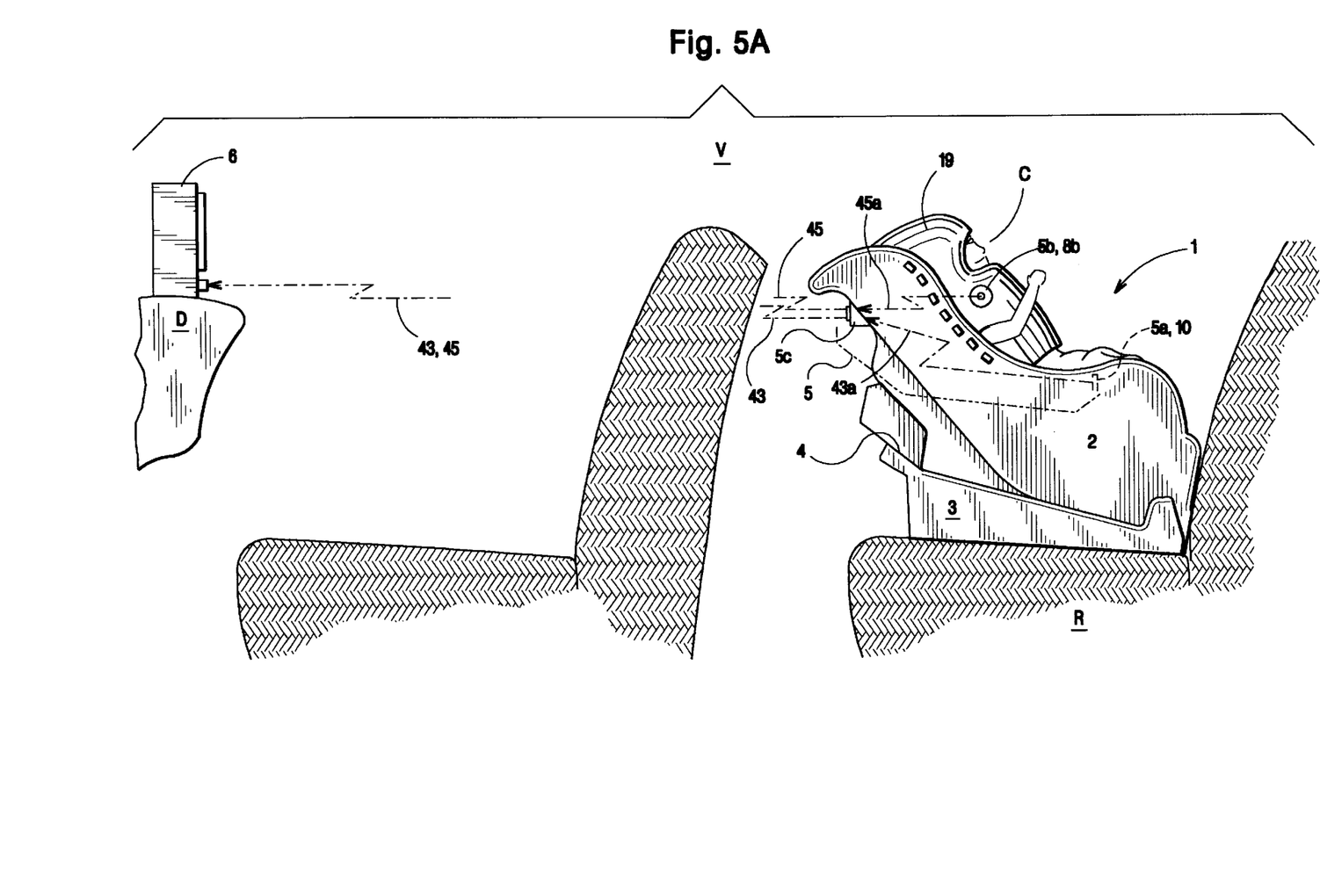
FIG. 5A is a view showing an alternate infant monitoring device of the present invention used to monitor an infant placed the infant bearing device of a vehicle safety seat.
Figure 5B:
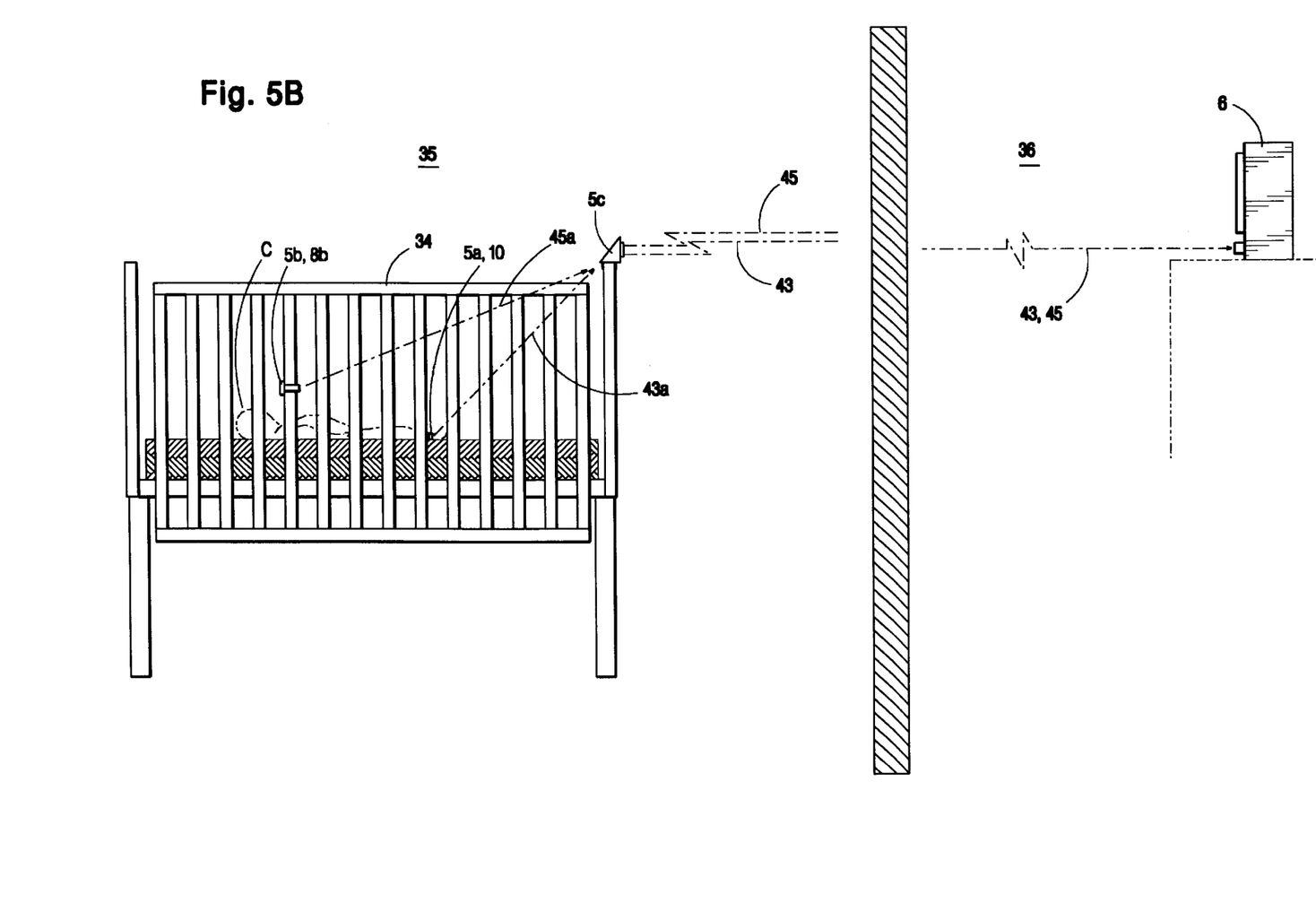
FIG. 5B is a view showing the infant monitoring device of FIG. 5A used to monitor an infant placed in an alternate infant bearing device.
Figure 5C:
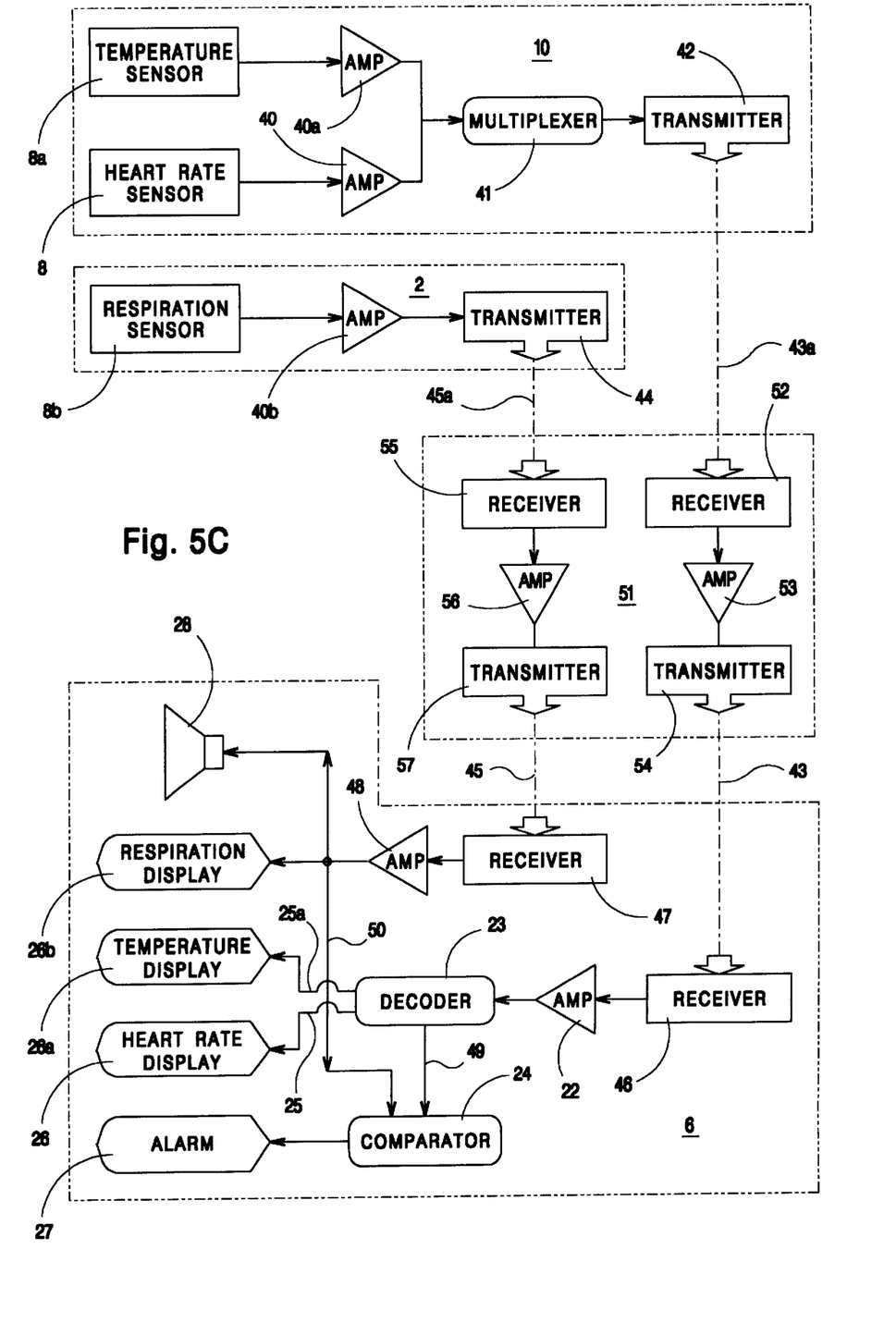
FIG. 5C is a schematic view showing another alternate embodiment of the sensor/transmitter and receiver/display units used to monitor an infant placed in an infant bearing device.

In another alternate embodiment shown in FIGS. 5A, 5B, and 5C, the infant monitoring device is shown disengaged from the passenger monitoring vehicle safety seat and attached to a different infant bearing device 34, for example, but not limited to, a crib. It should be understood that the S/T unit 5 and the R/D unit 6 are removable from the passenger monitoring vehicle safety seat and dashboard respectively for use with different infant bearing devices including cribs, beds, strollers, bassinets, carriages, and the like. In such instances, the S/T unit 5 is generally located in a different room from the R/D unit 6 as shown in FIG. 5B.

Still referring FIGS. 5A, 5B, and 5C, the infant monitoring device is shown being used in connection with the infant bearing device portion 2 of a vehicle safety seat 1 in FIG. 5A, and in connection with a different infant bearing device, for example a crib 34 in FIG. 5B. Crib 34 is shown located within a first room 35, and the R/D unit 6 is located in a second room 36. The sensor portion 5a, of the S/T unit comprises a bracelet 10 that includes at least one sensor, for example the heart rate sensor, and is attached to the infant "C" placed in the infant bearing device 2 or 34. The audio sensor 5b comprising a miniature-microphone 8b is attached to the infant bearing device 2 or 34 at a convenient location suitable for monitoring the breathing rhythm of the infant, and any other sounds the infant may make such as cries, and cooing. Preferably, the microphone is attached to crib 34 outside the reach of child "C". In a similar manner, the transmitter portion 5c is attached to crib 34 outside the reach of infant "C" at a location suitable for receiving the low frequency radio signals 43a and 45a emitted from the sensors located within bracelet 10 and the miniature microphone 8b respectively.

Referring to FIG. 5C, a sensor device comprising a bracelet 10 includes at least one sensor to detect and provide an electrical signal indicative of a selected vital function of the passenger being monitored. In the embodiment shown in FIG. 5C, the bracelet includes a heart rate sensor 8 and a temperature sensor 8a. The output signal from sensors 8 and 8a is sent to powered amplifiers 40 and 40a respectively and the increased signal is received by multiplexer 41 where the signals from amplifiers 40 and 40a are converted to digital form and the output from multiplexer 41 is fed into a transmitter 42 that transmits a radio signal 43a containing information from both sensors 8 and 8a. An audio or respiration sensor 8b is attached to the infant bearing device portion 2 of the passenger monitoring vehicle safety seat. The output signal generated by sensor 8b is sent to a powered amplifier 40b and the increased signal is received by transmitter 44 that transmits a radio signal 45a containing audio information from sensor 8b. The radio signals 43a and 45a are also low powered signals and the two radio signals are transmitted at different frequencies in order to maintain the information on separate channels.

An intermediate receiver/transmitter unit R/T 51 is provided to receive and retransmit the radio signals 43a and 45a generated by the transmitters 42 and 44. The R/T unit 51 includes a receiver 52 tuned to the incoming radio signals from transmitter 42, and a receiver 55 tuned to the incoming radio signals from transmitter 44. The received signals are amplified via amplifiers 53 and 56 and the increased signals are sent to transmitters 54 and 57 that transmit the radio signals 43 and 45 and received by the R/D unit 6.

The incoming radio signal 43 emitted from transmitter 54 is picked up by receiver 46. The acquired signal is sent to amplifier 22 powered by, for example, a 12 volt power source. The amplified signals are received by a decoder 23 that separates the combined signal into individual channels indicative of the respective vital functions being monitored. In this instance, decoder 23 separates the signals into a heart rate channel 25 and a temperature channel 25a. Each signal is analyzed by decoder 23 and the output is shown on a heart rate display 26 and a temperature display 26a provided in the R/D unit 6. The incoming radio signal 45 emitted from transmitter 57 is picked up by receiver 47 and the output from receiver 47, containing the audio signal information corresponding to sensor 8b, is fed to amplifier 48. The amplified audio or respiratory signals are fed to a respiratory display 26b and/or a speaker 28.

Additionally, the decoded heart rate and temperature is sent to comparator 24 along line 49, and the audio or respiratory data is sent to comparator 24 along line 50. The incoming stream of real time data received by comparator 24 is compared with pre-stored baseline information related to the vital functions being monitored. If any of the incoming real time data, for example heart rate, temperature, or respiratory data, falls outside certain limits set by the pre-stored information, a signal is sent from the comparator 24 to activate an audio/visual alarm 27. If desired, the pre-stored limits that trigger the alarm may be adjustable so a user will be able to select alarm settings.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

We claim:

1. A passenger monitoring vehicle safety seat that includes a system to monitor vital functions of a passenger placed in the vehicle safety seat, comprising:
    a) at least one sensor positioned to contact the passenger so that said at least one sensor provides an output signal indicative of at least one passenger vital function, said at least one passenger vital function selected from a group of vital functions comprising respiration, heart rate, and temperature; and
    b) a display unit remote from the vehicle safety seat, said display unit including
        i) a receiver to acquire said output signal indicative of said at least one passenger vital function; and
        ii) a visual display indicative of said at least one passenger vital function.

2. The invention recited in claim 1 wherein said at least one sensor provides a signal indicative of heart rate pertaining to the passenger and said visual display screen provides a display indicative of said heart rate.

3. The invention recited in claim 1 wherein said at least one sensor provides a signal indicative of temperature pertaining to the passenger and said visual display screen provides a display indicative of said temperature.

4. The invention recited in claim 1 wherein said at least one sensor provides a signal indicative of respiration pertaining to the passenger and said visual display screen provides a display indicative of said respiration.

5. The invention recited in claim 1 comprising:
    a) at least one sensor positioned to pickup and transmit to said display unit an audio output signal indicative of sound emitted by the passenger, and
    b) means resident in said display unit to provide a visual display indicative of said sound emitted by the passenger.

6. The invention recited in claim 5 wherein said display unit provides an audio response to said audio signal indicative of sound emitted by the passenger.

7. The invention recited in claim 1 wherein said at least one sensor is imbedded in a bracelet.

8. The invention recited in claim 1 wherein said at least one sensor is imbedded in an infant bearing portion of the passenger monitoring vehicle safety seat.

9. A passenger monitoring vehicle safety seat that includes a system to monitor vital functions of a passenger placed in the passenger monitoring vehicle safety seat, comprising:
    a) a sensor/transmitter unit including,
        i) at least two sensors, each sensor providing an output signal indicative of a selected vital function pertaining to the passenger,
        ii) a multiplexer that converts to digital form said vital function output signals emitted by said at least two sensors,
        iii) means to transmit said digital signal; and
    b) a receiver/display unit including,
        i) means to receive said digital signal transmitted by said sensor/transmitter unit,
        ii) a decoder that separates said digital signal into separate channels, each channel carrying vital function information related to one of the output signals emitted by said at least two sensors, and
        iii) a real time visual based upon vital function information received from said separate channels, said visual display indicative of the selected vital functions pertaining to the passenger.

10. The invention recited in claim 9 wherein said receiver/display unit includes:

a) a comparator having pre-stored baseline information corresponding to said selected vital functions monitored by said at least two sensors, said comparator including a resident program that compares incoming information received from said decoder with said pre-stored baseline information; and b) an alarm responsive to a condition where said incoming information received from said decoder fall outside a limit set by said pre-stored baseline information.

11. The invention recited in claim 10 wherein one of the signals emitted by said at least two sensors is indicative of heart rate pertaining to the passenger and said visual display provides a display indicative of said heart rate.

12. The invention recited in claim 10 wherein one of the signals emitted by said at least two sensors is indicative of temperature pertaining to the passenger and said visual display provides a display indicative of said temperature.

13. The invention recited in claim 10 wherein one of the signals emitted by said at least two sensors is indicative of respiration pertaining to the passenger and said visual display provides a display indicative of said respiration.

14. The invention recited in claim 10 wherein one of the signals emitted by said at least two sensors is an audio signal indicative of sound emitted by the passenger and said visual display screen provides a display indicative of said sound.

15. The invention recited in claim 14 wherein said display unit provides an audio response to said audio signal indicative of sound emitted by the passenger.

16. The invention recited in claim 10 wherein said at least two sensors are imbedded in a bracelet.

17. The invention recited in claim 10 wherein said at least one sensor is imbedded in an infant bearing portion of the passenger monitoring vehicle safety seat.

18. A infant bearing device that includes a system to monitor vital functions of an occupant, comprising:

a) a sensor/transmitter unit including,
   i) at least two sensors, each sensor providing an vital function output signal indicative of a selected vital function pertaining to the occupant,
   ii) a multiplexer that converts to digital form said vital function output signals emitted by said at least two sensors,
   iii) means to transmit said digital signal; and b) a receiver/display unit including,
   i) means to receive said digital signal transmitted by said sensor/transmitter unit,
   ii) a decoder that separates said digital signal into separate channels, each channel carrying vital function information related to one of the output signals emitted by said at least two sensors, and
   iii) a real time visual based upon vital function information received from said separate channels, said visual display indicative of the selected vital functions pertaining to the passenger.

19. The invention recited in claim 18 wherein said receiver/display unit includes:

a) a comparator having pre-stored baseline information corresponding to said selected vital functions monitored by said at least two sensors, said comparator including a resident program that compares incoming information received from said decoder with said pre-stored baseline information; and b) an alarm responsive to a condition where said incoming information received from said decoder fall outside a limit set by said pre-stored baseline information.

20. The invention recited in claim 18 wherein said sensor/transmitter unit is detachable from the infant bearing device.

21. The invention recited in claim 18 wherein one of the signals emitted by said at least two sensors is indicative of heart rate pertaining to the occupant and said visual display provides a display indicative of said heart rate.

22. The invention recited in claim 18 wherein one of the signals emitted by said at least two sensors is indicative of temperature pertaining to the occupant and said visual display provides a display indicative of said temperature.

23. The invention recited in claim 18 wherein one of the signals emitted by said at least two sensors is indicative of respiration pertaining to the occupant and said visual display provides a display indicative of said respiration.

24. The invention recited in claim 18 wherein one of the signals emitted by said at least two sensors is an audio signal indicative of sound emitted by the occupant and said visual display screen provides a display indicative of said sound.

25. The invention recited in claim 24 wherein said display unit provides an audio response to said audio signal indicative of sound emitted by the occupant.

26. The invention recited in claim 18 wherein said at least two sensors are imbedded in a bracelet.

27. The invention recited in claim 18 wherein said at least one sensor is imbedded in the infant bearing device.

28. The invention recited in claim 18 wherein said infant bearing device is a vehicle safety seat.

29. The invention recited in claim 18 wherein said infant bearing device is a crib.

30. The invention recited in claim 18 wherein said infant bearing device is a bed.

31. The invention recited in claim 18 wherein said infant bearing device is a stroller.

32. The invention recited in claim 18 wherein said infant bearing device is a carriage.

33. A method for monitoring vital functions of an infant placed in an infant bearing device, the steps of the method comprising:

providing at least one sensor positioned to contact the infant; generating with said at least one sensor an output signal indicative of at least one infant vital function selected from a group of infant vital functions comprising respiration, heart rate, and temperature;

receiving with a display unit said output signal generated by said at least one sensor; and providing a visual display based upon said output signal received by said display unit, said visual display indicative of said at least one infant vital function.

34. The method recited in claim 33 including the further steps, comprising:

converting said output signal emitted by said at least one sensor to a digital form;

transmitting said digital form signal;

receiving said digital form signal with said display unit; and providing said visual display based upon said received said digital form signal.

35. The method recited in claim 34 including the further steps comprising:

decoding and separating into channels said digital form signal received with said display unit; and providing said visual display based upon incoming decoded information received from said channels.

36. The method recited in claim 35 including the further steps comprising:

analyzing with a resident program said incoming decoded information with stored baseline information indicative of said selected vital functions pertaining to the infant placed in the infant bearing device; and providing an alarm responsive to a condition where said incoming decoded information falls outside a limit based upon said stored baseline information.

* * * * *